United States Patent
Fukuda et al.

(10) Patent No.: US 11,150,351 B2
(45) Date of Patent: Oct. 19, 2021

(54) BRAKE CONTROL DEVICE AND BRAKE SYSTEM

(71) Applicant: Shimano Inc., Osaka (JP)

(72) Inventors: Masahiko Fukuda, Osaka (JP); Toshihiko Takahashi, Osaka (JP); Hitoshi Takayama, Osaka (JP); Masahiro Nakakura, Osaka (JP); Takehiko Nakajima, Osaka (JP)

(73) Assignee: Shimano Inc., Osaka (JP)

( * ) Notice: Subject to any disclaimer, the term of this patent is extended or adjusted under 35 U.S.C. 154(b) by 174 days.

(21) Appl. No.: 16/255,456

(22) Filed: Jan. 23, 2019

(65) Prior Publication Data
US 2019/0233049 A1 Aug. 1, 2019

(30) Foreign Application Priority Data
Jan. 26, 2018 (JP) .............................. JP2018-012028

(51) Int. Cl.
| | | |
|---|---|---|
| *G01S 17/89* | (2020.01) | |
| *B62J 99/00* | (2020.01) | |
| *B62M 6/55* | (2010.01) | |
| *G01S 17/58* | (2006.01) | |
| *G01S 19/52* | (2010.01) | |

(Continued)

(52) U.S. Cl.
CPC .............. *G01S 17/89* (2013.01); *B62J 99/00* (2013.01); *B62L 1/00* (2013.01); *B62M 6/55* (2013.01); *G01P 3/00* (2013.01); *G01S 17/58* (2013.01); *G01S 19/52* (2013.01); *B62J 45/20* (2020.02); *B62J 45/40* (2020.02)

(58) Field of Classification Search
CPC ..... B62L 1/00; B62L 3/02; B62J 99/00; B62J 50/20; B62J 45/20; B62J 6/045; B62M 6/55; B60W 30/18109; B60W 2510/18; B60W 2710/18; B60Y 2300/18108; B60Y 2400/81; B60G 2800/22; B60L 3/0076; B60L 3/108; B60T 2270/60; B60T 2270/602

See application file for complete search history.

(56) References Cited

U.S. PATENT DOCUMENTS 6,973,999 B2 * 12/2005 Ikuta ................ A01K 89/01555
188/161
8,958,935 B2 * 2/2015 Shoge ..................... B62M 6/55
701/22

(Continued)

FOREIGN PATENT DOCUMENTS

| JP | 6-107157 A | 4/1994 |
| JP | 2005-14791 A | 1/2005 |

(Continued)

*Primary Examiner* — Ig T An
(74) *Attorney, Agent, or Firm* — Global IP Counselors, LLP (57) ABSTRACT

A brake control device includes an electronic controller that executes an ABS control on a rotating body of a human-powered vehicle. The electronic controller executes the ABS control based on a relationship between a first speed and a second speed related to the human-powered vehicle. The first speed includes a speed of the human-powered vehicle based on information of a traveling environment. The second speed includes a speed of the human-powered vehicle based on a rotational speed of the rotating body.

24 Claims, 4 Drawing Sheets

(51) Int. Cl.
 *B62J 45/20* (2020.01)
 *B62J 45/40* (2020.01)
 *B62L 1/00* (2006.01)
 *G01P 3/00* (2006.01)

(56) References Cited

U.S. PATENT DOCUMENTS

| | | | |
|---|---|---|---|
| 9,266,583 B2* | 2/2016 | Getta | B62M 6/55 |
| 9,840,305 B1* | 12/2017 | Tsuchizawa | B62M 6/55 |
| 10,053,184 B2* | 8/2018 | Tsuchizawa | B60L 50/20 |
| 10,259,311 B2* | 4/2019 | Biderman | B60L 58/13 |
| 2008/0111342 A1 | 5/2008 | Niekerk et al. | |
| 2011/0273005 A1 | 11/2011 | Westerfeld | |
| 2012/0012412 A1* | 1/2012 | Moeller | B62M 6/65 |
| | | | 180/206.2 |
| 2013/0041576 A1* | 2/2013 | Switkes | G08G 1/22 |
| | | | 701/123 |
| 2016/0318575 A1* | 11/2016 | Shimoda | B62M 6/55 |
| 2017/0183013 A1 | 6/2017 | Matsumoto et al. | |
| 2018/0265084 A1 | 9/2018 | Inou et al. | |
| 2019/0250619 A1* | 8/2019 | Gillett | H04W 76/14 |

FOREIGN PATENT DOCUMENTS

| | | |
|---|---|---|
| JP | 2006-142895 A | 6/2006 |
| JP | 2014-19374 A | 2/2014 |
| JP | 2016-203932 A | 12/2016 |
| JP | 2017-102827 A | 6/2017 |
| JP | 2017-114431 A | 6/2017 |
| WO | 2010/046991 A1 | 4/2010 |
| WO | 2013/146907 A1 | 10/2013 |

\* cited by examiner

BRAKE CONTROL DEVICE AND BRAKE SYSTEM

CROSS-REFERENCE TO RELATED APPLICATIONS

This application claims priority to Japanese Patent Application No. 2018-012028, filed on Jan. 26, 2018. The entire disclosure of Japanese Patent Application No. 2018-012028 is hereby incorporated herein by reference.

BACKGROUND

Technical Field

The present invention generally relates to a brake control device and a brake system including a brake control device.

Background Information

U.S. Patent Application Publication No. 2008/0111342 discloses an example of a brake control device mounted on a human-powered vehicle. The brake control device executes ABS control based on a vehicle body speed of the human-powered vehicle, which is estimated using the detection result of an acceleration sensor, and a speed of a wheel, which is detected by a speed sensor.

SUMMARY

It is preferred that the ABS control be executed on the human-powered vehicle in a further optimal manner.

A brake control device in accordance with a first aspect of the present disclosure comprises an electronic controller is configured to execute an ABS control on a rotating body of a human-powered vehicle. The electronic controller is configured to execute the ABS control based on a relationship between a first speed and a second speed related to the human-powered vehicle. The first speed includes a speed of the human-powered vehicle based on information of a traveling environment. The second speed includes a speed of the human-powered vehicle based on a rotational speed of the rotating body.

In accordance with the brake control device of the first aspect, the traveling environment of the human-powered vehicle is taken into consideration in the ABS control. Thus, the ABS control is executed on the human-powered vehicle in a further preferred manner.

In accordance with a second aspect of the present disclosure, the brake control device according to the first aspect is configured so that the information of the traveling environment includes a position of the human-powered vehicle relative to the traveling environment.

In accordance with the brake control device of the second aspect, the ABS control is executed on the human-powered vehicle in a further preferred manner.

In accordance with a third aspect of the present disclosure, the brake control device according to the first or second aspect is configured so that the first speed includes a speed of the human-powered vehicle relative to a traveling road surface.

In accordance with the brake control device of the third aspect, the ABS control is executed on the human-powered vehicle in a further preferred manner.

In accordance with a fourth aspect of the present disclosure, the brake control device according to any one of the first to third aspects is configured so that the electronic controller is configured to execute the ABS control based on a difference between the first speed and the second speed.

In accordance with the brake control device of the fourth aspect, the ABS control is configured to executed on the human-powered vehicle in a further preferred manner.

In accordance with a fifth aspect of the present disclosure, the brake control device according to the fourth aspect is configured so that the electronic controller is configured to start the ABS control in a case where an absolute value of the difference between the first speed and the second speed is larger than or equal to a first predetermined difference.

In accordance with the brake control device of the fifth aspect, the ABS control is started based on the first predetermined difference. Thus, the ABS control is executed on the human-powered vehicle in a further preferred manner.

In accordance with a sixth aspect of the present disclosure, the brake control device according to the fourth or fifth aspect is configured so that the electronic controller is configured to terminate the ABS control in a case where the absolute value of the difference between the first speed and the second speed during execution of the ABS control is smaller than or equal to a second predetermined difference.

In accordance with the brake control device of the sixth aspect, the ABS control is terminated based on the second predetermined difference. Thus, the ABS control is executed on the human-powered vehicle in a further preferred manner.

In accordance with a seventh aspect of the present disclosure, the brake control device according to any one of the first to sixth aspect is configured so that the electronic controller is configured to adjust a decrease amount of the braking force of the rotating body in accordance with a difference between the first speed and the second speed in a case where a braking force of the rotating body is decreased by the ABS control.

In accordance with the brake control device of the seventh aspect, the ABS control is executed on the human-powered vehicle in a further preferred manner.

In accordance with an eighth aspect of the present disclosure, the brake control device according to the seventh aspect is configured so that the electronic controller is configured to increase the decrease amount of a braking force of the rotating body as the absolute value of the difference between the first speed and the second speed increases.

In accordance with the brake control device of the eighth aspect, sliding of the human-powered vehicle is limited in a preferred manner.

In accordance with a ninth aspect of the present disclosure, the brake control device according to any one of the first to eighth aspects is configured so that the electronic controller is configured to obtain the first speed from a first detector configured to detect the first speed.

In accordance with the brake control device of the ninth aspect, the first speed is easily obtained.

In accordance with a tenth aspect of the present disclosure, the brake control device according to the ninth aspect is configured so that the first detector includes an imaging device that is configured to capture an image of the traveling environment.

In accordance with the brake control device of the tenth aspect, the first speed is easily obtained.

In accordance with an eleventh aspect of the present disclosure, the brake control device according to the ninth or tenth aspect is configured so that the first detector includes a transmitting unit that is configured to transmit a signal toward the traveling environment, and a receiving unit that is configured to receive a reflected signal from the traveling environment.

In accordance with the brake control device of the eleventh aspect, the first speed is easily obtained.

In accordance with a twelfth aspect of the present disclosure, the brake control device according to the eleventh aspect is configured so that the transmitting unit includes a light emitter that is configured to emit light to a traveling road surface, and the receiving unit includes a light receiver that is configured to receive light reflected from the traveling road surface.

In accordance with the brake control device of the twelfth aspect, the first speed is easily obtained.

In accordance with a thirteenth aspect of the present disclosure, the brake control device according to any one of the ninth to twelfth aspects is configured so that the first detector includes a LIDAR.

In accordance with the brake control device of the thirteenth aspect, the first speed is easily obtained.

In accordance with a fourteenth aspect of the present disclosure, the brake control device according to any one of the ninth to thirteenth aspects is configured so that the first detector includes a GPS sensor.

In accordance with the brake control device of the fourteenth aspect, the first speed is easily obtained.

In accordance with a fifteenth aspect of the present disclosure, the brake control device according to the first to fourteenth aspects is configured so that the electronic controller is configured to calculate the second speed based on a detection result of a second detector that detects at least one of a rotational speed of the rotating body and a rotational speed of a transmission member that transmits human driving force to the rotating body.

In accordance with the brake control device of the fifteenth aspect, the second speed is easily obtained.

In accordance with a sixteenth aspect of the present disclosure, the brake control device according to the first to fifteenth aspects is configured so that the rotating body includes at least one of a wheel provided on the human-powered vehicle and a rotating member rotated integrally with the wheel.

In accordance with the brake control device of the sixteenth aspect, the second speed is easily obtained.

In accordance with a seventeenth aspect of the present disclosure, the brake control device according to any one of the first to sixteenth aspects is configured so that the rotating body includes a first rotating body and a second rotating body, and the electronic controller is configured to execute the ABS control on the first rotating body based on a detection result from a first detector configured to detect the first speed and a detection result of a first rotation detector configured to detect a rotational speed of the first rotating body, and the electronic controller is configured to execute the ABS control on the second rotating body based on the detection result from the first detector and a detection result of a second rotation detector configured to detect a rotational speed of the second rotating body.

In accordance with the brake control device of the seventeenth aspect, the ABS control is executed on the human-powered vehicle including a plurality of rotating bodies in a further preferred manner.

A brake system in accordance with an eighteenth aspect of the present disclosure comprises the brake control device according to any one of the ninth to fourteenth aspects, and the first detector.

In accordance with the brake system of the eighteenth aspect, the ABS control is executed on the human-powered vehicle in a further preferred manner.

In accordance with a nineteenth aspect of the present disclosure, the brake system according to the eighteenth aspect is configured so that the first detector is provided on at least one of a main body of the human-powered vehicle and an attachment member moved relative to the traveling environment integrally with the main body.

In accordance with the brake system of the nineteenth aspect, the first speed is easily obtained.

A brake system in accordance with a twentieth aspect of the present disclosure comprises the brake control device according to the fifteenth aspect, and the second detector.

In accordance with the brake system of the twentieth aspect, the second speed is easily obtained.

A brake system in accordance with a twenty-first aspect of the present disclosure comprises the brake control device according to any one of the first to twentieth aspects, and a braking device.

In accordance with the brake system of the twenty-first aspect, the ABS control is executed on the human-powered vehicle in a further preferred manner.

In accordance with a twenty-second aspect of the present disclosure, the brake system according to any one of the eighteenth to twenty-first aspects further comprises an operating device that is configured to be manually operated to brake the rotating body.

In accordance with the brake system of the twenty-second aspect, the rotating body is easily braked.

In accordance with a twenty-third aspect of the present disclosure, the brake system according to any one of the eighteenth to twenty-second aspects further comprises a driving unit that assists a driving force of the human-powered vehicle.

In accordance with the brake system of the twenty-third aspect, the convenience of the human-powered vehicle is improved.

A brake system in accordance with a twenty-fourth aspect of the present disclosure comprises a brake control device provided on a human-powered vehicle including a main body and a rotating body rotated relative to the main body. The brake control device includes an electronic controller that is configured to execute an ABS control on the rotating body. The brake system further comprises a first detector that is configured to obtain information from a traveling environment, and a second detector that is configured to obtain a rotational speed of the rotating body. The electronic controller executes the ABS control based on information from the first detector and the second detector.

In accordance with the brake system of the twenty-fourth aspect, the ABS control is executed taking into consideration the traveling environment of the human-powered vehicle. Thus, the ABS control is executed on the human-powered vehicle in a further preferred manner.

A brake system in accordance with a twenty-fifth aspect of the present disclosure comprises a brake control device provided on a human-powered vehicle including a main body and a rotating body rotated relative to the main body. The brake control device includes an electronic controller that is configured to execute an ABS control on the rotating body. The brake system further comprises an assist device including a driving unit that assists a driving force of the human-powered vehicle, a first detector configured to obtain at least one of a speed and an acceleration of the human-powered vehicle, and a second detector configured to obtain a rotational speed of the rotating body. The electronic controller is further configured to execute the ABS control based on information from the first detector and the second detector.

In accordance with the brake system of the twenty-fifth aspect, the ABS control is executed on the human-powered vehicle in a further preferred manner.

In accordance with a twenty-sixth aspect of the present disclosure, the brake system according to the twenty-fifth aspect is configured so that the first detector is further configured to obtain at least one of the speed and the acceleration of the human-powered vehicle from the assist device.

In accordance with the brake system of the twenty-sixth aspect, the speed and acceleration of the human-powered vehicle are easily obtained.

In accordance with the brake control device and the brake system according to the present disclosure, the ABS control is executed in a further preferred manner.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents. The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

Embodiment

Figure 1:
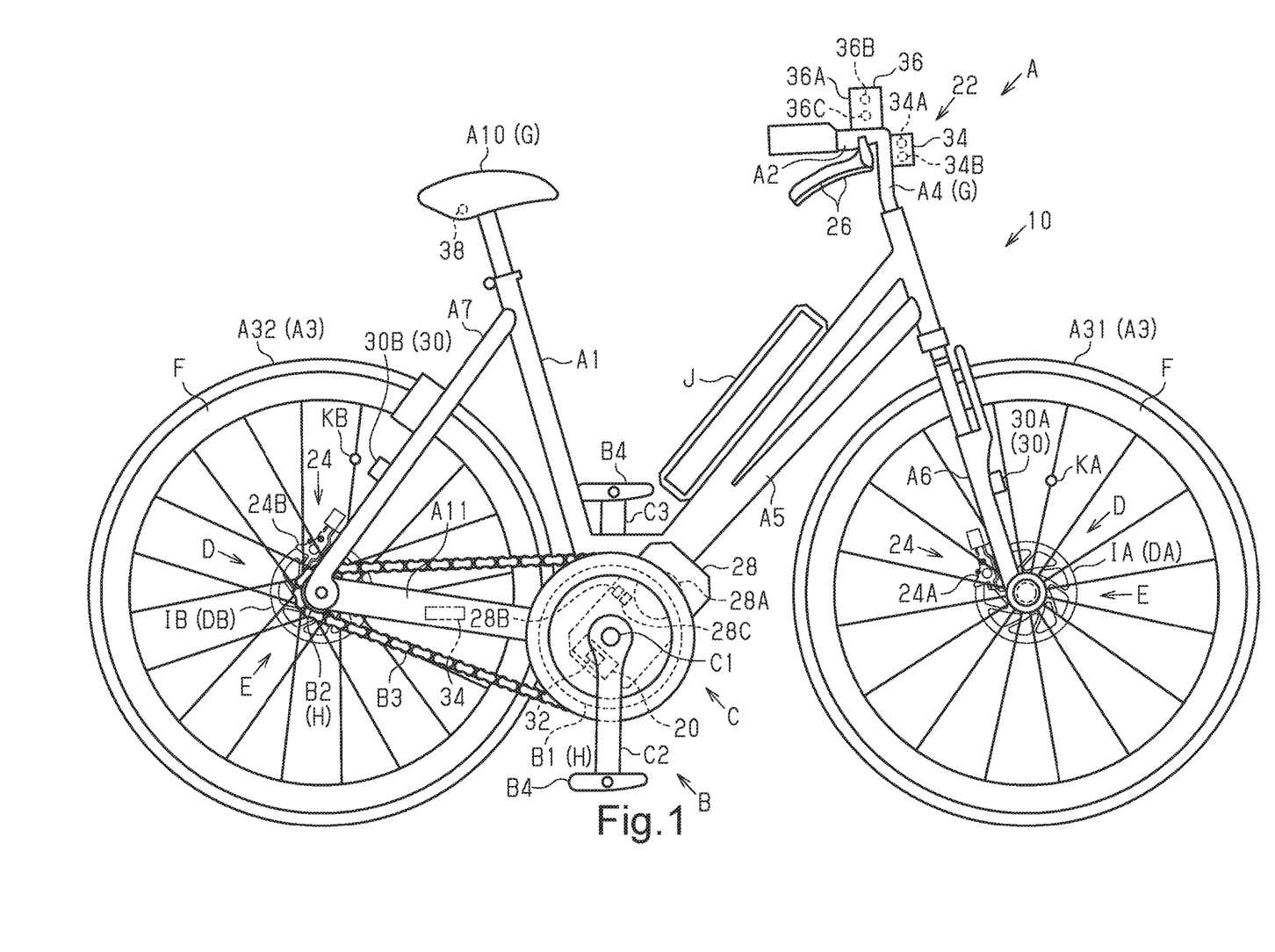
FIG. 1 is a side elevational view of a human-powered vehicle equipped with a brake system in accordance with one embodiment.

A human-powered vehicle A including a brake system 10 will now be described with reference to FIG. 1. Here, the human-powered vehicle refers to a vehicle that at least partially uses human force as a prime mover for traveling, and includes vehicles that assist human force with electric power. The human-powered vehicle does not include vehicles that only use force other than human force as a prime mover. In particular, the human-powered vehicle does not include vehicles that use only an internal combustion engine as the prime mover. Generally, the human-powered vehicle is a compact light vehicle that does not require a license for driving on a public road. The illustrated human-powered vehicle A is a bicycle (e-bike) including an assist device 28 that assists the propulsion of the human-powered vehicle A using electric energy. More specifically, the illustrated human-powered vehicle A is a city cycle. The configuration of the human-powered vehicle A can be changed to any configuration. The human-powered vehicle A can be configured without the assist device 28. In other words, the human-powered vehicle A can be a normal bicycle driven only by human driving force. The type of human-powered vehicle A can be a road bike, a mountain bike, or a cross bike. The human-powered vehicle A includes a main body A1, a handlebar A2, wheels A3, a handle stem A4, a drive mechanism B, a battery J, and the brake system 10. The main body A1 includes a frame A5. The wheels A3 include a front wheel A31 and a rear wheel A32.

The drive mechanism B transmits human driving force to the rear wheel A32. The drive mechanism B includes a front sprocket B1, a rear sprocket B2, a chain B3, a crank mechanism C, and a pair of pedals B4. The drive mechanism B can be, for example, of a belt drive type or a shaft drive type.

The crank mechanism C includes a crankshaft C1, a right crank C2, and a left crank C3. The crankshaft C1 is rotatably supported by a bottom bracket (not shown) provided on the frame A5. The right crank C2 and the left crank C3 are each connected to the crankshaft C1. One of the two pedals B4 is rotatably supported by the right crank C2. The other one of the two pedals B4 is rotatably supported by the left crank C3.

The front sprocket B1 is connected to the crankshaft C1. The rotational axis of the crankshaft C1 is coaxial with the rotational axis of the front sprocket B1. Any structure for connecting the front sprocket B1 to the crankshaft C1 can be selected. A one-way clutch (not shown) is provided between the crankshaft C1 and the front sprocket B1. The one-way clutch transmits the rotational of the crankshaft C1 to the front sprocket B1 in a case where the rotational speed of the forward rotating crankshaft C1 is higher than the rotational speed of the front sprocket B1. The one-way clutch can be omitted.

The rear sprocket B2 is supported by a hub of the rear wheel A32. The chain B3 is wound around the front sprocket B1 and the rear sprocket B2. In a case where the crankshaft C1 and the front sprocket B1 are rotated forward by the human driving force applied to the pair of pedals B4, the rear wheel A32 is rotated forward by the human driving force transmitted via the chain B3 and the rear sprocket B2. The battery J supplies power to the brake system 10. The battery J includes, for example, a rechargeable battery. The battery J is provided anywhere on the main body A1.

Figure 2:
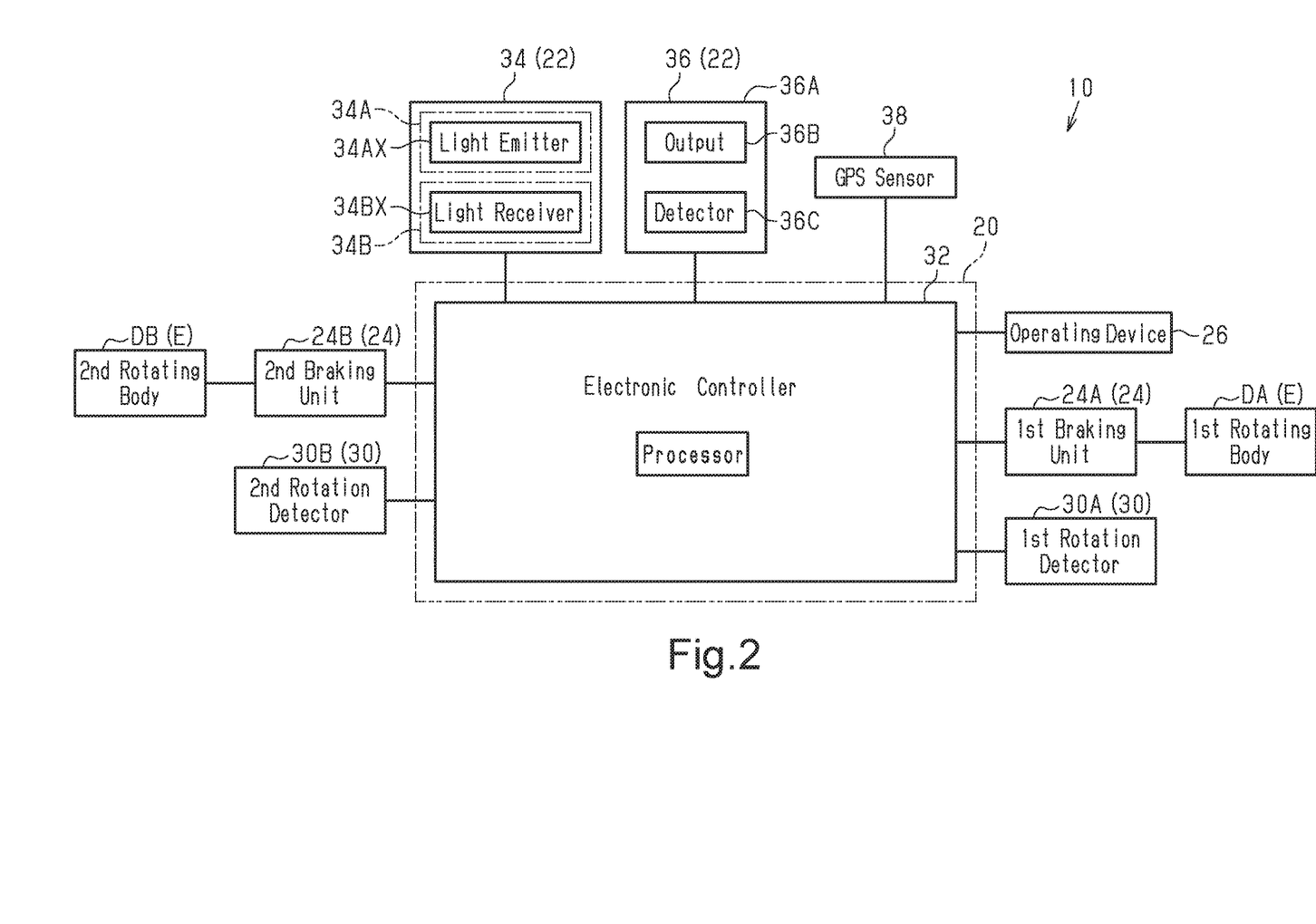
FIG. 2 is a block diagram diagrammatically showing the brake system of FIG. 1.

The brake system 10 includes a brake control device 20 and a first detector 22. Preferably, the brake system 10 includes a braking device 24, an operating device 26, an assist device 28, and second detectors 30. The brake control device 20 includes an electronic controller 32. The electronic controller 32 executes antilock brake system (ABS) control on rotating bodies D of the human-powered vehicle A. The electronic controller 32 is a central processing unit (CPU) or a micro-processing unit (MPU). The electronic controller 32 can include one or more microcomputers that includes one or more processors and one or more computer storage devices (i.e., computer memory devices). The electronic controller 12 is formed of one or more semiconductor chips that are mounted on a printed circuit board. The term "electronic controller" as used herein refers to hardware that executes a software program.

The first detector 22 is configured to detect the ground speed which is the speed of the frame A5 with respect to a traveling road surface of the human-powered vehicle A. The first detector 22 is provided on at least one of the main body A1 of the human-powered vehicle A and an attachment member G moved relative to the traveling environment integrally with the main body A1. Examples of the attachment member G are the handlebar A2 and a saddle A10. The first detector 22 includes an imaging device 34, a laser imaging detection and ranging (LIDAR) 36, and a global positioning system (GPS) sensor 38.

The imaging device 34 is configured to capture an image of the traveling environment of the human-powered vehicle A. For example, the imaging device 34 is mounted on the handle stem A4 to capture an image of the front side, ahead, of the human-powered vehicle A. In another example, the imaging device 34 is mounted on, for example, a seat post to capture an image of the rear side, behind, of the human-powered vehicle A. The imaging device 34 is configured to communicate with the electronic controller 32 through wired or wireless connection. The imaging device 34 captures an image as at least one of a still image and a moving image and stores an image signal in a predetermined format together with sound. The imaging device 34 is configured to output image signals to the outside through wired or wireless connection. The imaging device 34 includes a transmitting unit 34A configured to transmit a signal toward the traveling environment and a receiving unit 34B configured to receive a reflected signal from the traveling environment. The transmitting unit 34A includes a light emitter 34AX (refer to FIG. 2) configured to emit light to the traveling road surface. The receiving unit 34B includes a light receiver 34BX (refer to FIG. 2) configured to receive light reflected from the traveling road surface.

In a case where the imaging device 34 captures images as still images, the electronic controller 32 checks a first still image and a second still image, which is captured after the first still image, and calculates a moving distance of the human-powered vehicle A from a point where the first still image was captured to a point where the second still image was captured. The electronic controller 32 calculates the ground speed based on the relationship between the calculated moving distance of the human-powered vehicle A and the elapsed time from the point of time at which the first still image was captured to the point of time at which the second still image was captured. In a case where the imaging device 34 captures a moving image, the electronic controller 32 extracts the first still image and the second still image from the moving image, and calculates the ground speed through a similar procedure as in the case where the imaging device 34 captures still images.

In another example, the electronic controller 32 calculates the ground speed based on a time (hereinafter referred to as "the first reception time") from the point of time at which the transmitting unit 34A transmitted a signal toward the traveling road surface to the point of time at which the receiving unit 34B received the reflected signal from the traveling road surface and a first reference reception time, which is the first reception time in a case where the human-powered vehicle A is stationary. In a further example, the imaging device 34 is provided on, for example, a chain stay A11 or a bottom bracket (not shown) of the human-powered vehicle A, as shown by double-dashed lines in FIG. 1. The transmitting unit 34A transmits a signal in a vertical direction toward the traveling road surface. The receiving unit 34B includes a predetermined region for receiving a reflected signal from the traveling road surface. The electronic controller 32 calculates the ground speed based on a difference between a reference position in the predetermined region and the position where the receiving unit 34B actually received the signal in the predetermined region. The reference position is where the reflected signal from the road surface is received in a predetermined region in a case where the human-powered vehicle A is stationary and the transmitting unit 34A transmits a signal toward the road surface.

The LIDAR 36 is mounted on, for example, the handlebar A2. The LIDAR 36 is provided on the human-powered vehicle A so as to detect electromagnetic waves of a predetermined frequency. The LIDAR 36 is configured to communicate with the electronic controller 32 through wired or wireless connection. The LIDAR 36 outputs electromagnetic waves of a predetermined frequency and detects an echoed electromagnetic wave. In one example, the LIDAR 36 detects at least one of ultraviolet light, infrared light, submillimeter wave, and millimeter wave. The LIDAR 36 outputs an electromagnetic wave including at least one of ultraviolet light, infrared light, submillimeter wave, and millimeter wave, and detects an echoed electromagnetic wave. The LIDAR 36 includes a housing 36A, an output 36B, and a detector 36C. The housing 36A is provided on, for example, the handlebar A2 (refer to FIG. 1). The output 36B and the detector 36C are arranged inside the housing 36A. The output 36B outputs electromagnetic waves to a traveling road surface or a structural object (hereinafter referred to as "the detection subject") existing near the human-powered vehicle A. From the electromagnetic wave output by the output 36B, the detector 36C receives the electromagnetic wave (hereinafter referred to as "the reflected electromagnetic wave") reflected by the detection subject. The electronic controller 32 acquires the distance to the detection subject and the orientation in which the detection subject exists based on the time (hereinafter referred to as "the second reception time") from the point of time at which the output 36B output an electromagnetic wave toward the detection subject to the point of time at which the detector 36C received the reflected electromagnetic wave from the detection subject. The electronic controller 32 checks the distance (hereinafter referred to as "the first distance") to the detection subject obtained in the second reception time and the orientation in which the detection subject exists (hereinafter referred to as "the first target orientation"), and the distance (hereinafter referred to as "the second distance") to the detection subject obtained after the time the first distance was obtained and the orientation in which the detection subject exists (hereinafter referred to as "second target orientation"). The electronic controller 32 calculates the moving distance of the human-powered vehicle A from where the first distance was obtained to where the second distance was obtained, and calculates the ground speed based on the relationship of the calculated moving distance of the human-powered vehicle A and the time elapsed from the point of time at which the first distance was obtained to the point of time at which the second distance was obtained.

The GPS sensor 38 is mounted on, for example, the saddle A10 and receives signals from GPS satellites. The GPS sensor 38 is configured to communicate with the electronic controller 32 through wired or wireless connection. The electronic controller 32 calculates the ground speed based on the moving distance of the human-powered vehicle A included in the signal transmitted from the GPS satellite and the time used to move over the moving distance.

The braking device 24 is driven by electric power supplied from the battery J to brake the rotating bodies D of the human-powered vehicle A. The rotating bodies D includes a first rotating body DA and a second rotating body DB. In one example, the first rotating body DA is a disc brake rotor IA provided on the front wheel A31 of the human-powered vehicle A. The disc brake rotor IA rotates together with the front wheel A31. In one example, the second rotating body DB is the disc brake rotor IB provided on the rear wheel A32. The disc brake rotor IB rotates together with the rear wheel A32. In this embodiment, the braking device 24 includes a first braking unit 24A and a second braking unit 24B. The first braking unit 24A and the second braking unit 24B each include a disc brake caliper configured to braking the corresponding one of the rotating bodies DA and DB, which are disc brake rotors. The rotating bodies D that are braked can be the rim F (refer to FIG. 1) of the front wheel A31 and the rear wheel A32. In this case, the first braking unit 24A and the second braking unit 24B each include a rim brake caliper.

The first braking unit 24A brakes the disc brake rotor IA. The second braking unit 24B brakes a disc brake rotor IB. Each of the braking units 24A and 24B includes two disc brake pads. One of the disc brake pads faces one surface of the rotating body D to be pressed against the surface of the rotating body D by a pivoting mechanism (not shown) and thereby brake the rotating body D. The other one of the disc brake pads is faces the other surface of the rotating body D to be pressed against the surface of the rotating body D by the pivoting mechanism (not shown) and thereby brake the rotating body D. The pivoting mechanism moves each disc brake pad forward and backward with respect to the rotating body D. The pivoting mechanism is directly driven by an electric motor (not shown) provided integrally with the braking units 24A and 24B. In another example, the electric motor and the braking units 24A and 24B are provided separately from each other, and the pivoting mechanism is indirectly driven by the electric motor. In this case, hydraulic fluid or a cable (Bowden cable) is used as a power transmission medium of the electric motor. In a case where hydraulic fluid is used as the power transmission medium, the pump is driven by the electric motor. In a case where a cable is used as the power transmission medium, the braking device 24 has a cable winding/feeding mechanism including a gear driven by the electric motor.

Each of the operating devices 26 is configured to be manually operated by the user to brake the corresponding rotating body D. Therefore, the rotating body D can easily be braked. The operating device 26 includes, for example, a lever. The operating device 26 is connected to the electronic controller 32 and configured to communicate with the electronic controller 32 so that a signal corresponding to an operation can be transmitted to the electronic controller 32 of the brake control device 20. The operating device 26 is connected to the electronic controller 32 and configured to communicate with the electronic controller 32 through an electric wire or communication line that allows for power line communication (PLC). The operating device 26 can be connected to the electronic controller 32 and configured to communication with the electronic controller 32 by a wireless communication unit. In a case where the operating device 26 is operated, a signal for braking at least one of the front wheel A31 and the rear wheel A32 is transmitted to the electronic controller 32, and the braking device 24 is operated according to the signal. In this embodiment, the operating device 26 is provided in correspondence with each of the first braking unit 24A and the second braking unit 24B. Instead, the operating device 26 can be shared by the first braking unit 24A and the second braking unit 24B.

The assist device 28 includes a driving unit 28A (refer to FIG. 1), a driving circuit 28B (refer to FIG. 1), a speed reducer 28C (refer to FIG. 1), and a one-way clutch (not shown). The assist device 28 assists the driving force of the human-powered vehicle A by transmitting torque to the front sprocket B1. This improves the convenience of the human-powered vehicle A.

The second detectors 30 is configured to detect at least one of the rotational speed of the corresponding rotating body D and the rotational speed of the transmission member H transmitting the human driving force to the rotating body D. The rotating body D includes at least one of the wheel A3 provided on the human-powered vehicle A and a rotating member E rotating integrally with the wheel A3. Examples of the rotating member E are the disc brake rotor IA and IB. Examples of the transmission member H is the front sprocket B1 and the rear sprocket B2.

The second detectors 30 include a first rotation detector 30A configured to detect the rotational speed of the first rotating body DA and a second rotation detector 30B configured to detect the rotational speed of the second rotating body DB. The first rotation detector 30A detects the rotational speed of the front wheel A31 of the human-powered vehicle A. The first rotation detector 30A is configured to communicate with the electronic controller 32 through wired or wireless connection. In this embodiment, the first rotation detector 30A is mounted on the front fork A6 (refer to FIG. 1) of the frame A5. The first rotation detector 30A outputs a signal, which corresponds to a change in the relative positions of a magnet KA mounted on the front wheel A31 and the first rotation detector 30A, to the electronic controller 32 of the brake system 10. The electronic controller 32 calculates the rotational speed of the front wheel A31 based on the signal. The first rotation detector 30A can be provided on the first braking unit 24A so as to detect the rotation of the rotating member E.

The second rotation detector 30B detects the rotational speed of the rear wheel A32 of the human-powered vehicle A. The second rotation detector 30B is configured to communicate with the electronic controller 32 through wired or wireless connection. In this embodiment, the second rotation detector 30B is mounted on the seat stay A7 (refer to FIG. 1) of the frame A5. The second rotation detector 30B outputs a signal, which corresponds to a change in the relative positions of a magnet KB mounted on the rear wheel A32 and the second rotation detector 30B, to the electronic controller 32 of the brake system 10. The electronic controller 32 calculates the rotational speed of the rear wheel A32 based on the signal. The second rotation detector 30B can be provided on the second braking unit 24B so as to detect the rotation of the rotating member E.

The electronic controller 32 executes brake control to apply a braking force to the rotating body D with the braking device 24. The electronic controller 32 executes ABS control in the brake control. The electronic controller 32 executes the ABS control based on the relationship of a first speed VA and a second speed VB related to the human-powered vehicle A. The first speed VA includes the speed of the human-powered vehicle A based on the information of the traveling environment. The second speed VB includes the speed of the human-powered vehicle A based on the rotational speed of the rotating body D. The information of the traveling environment includes a position of the human-powered vehicle A relative to the traveling environment. Therefore, the ABS control is executed on the human-powered vehicle A in a further preferred manner. The first speed includes a speed of the human-powered vehicle A relative to the traveling road surface. Therefore, the ABS control is executed on the human-powered vehicle A in a further preferred manner. The electronic controller 32 executes the ABS control based on the difference of the first speed VA and the second speed VB. Therefore, the ABS control is executed on the human-powered vehicle A in a further preferred manner. In a case where the absolute value of the difference of the first speed VA and the second speed VB is larger than or equal to a first predetermined difference, the electronic controller starts the ABS control. Therefore, the ABS control is executed on the human-powered vehicle A in a further preferred manner. The first predetermined difference is a speed difference allowing for determination that the rotating body D is in a state locked by the braking device 24 (hereinafter referred to as "locked state of the rotating body D") because the second speed VB is much lower than the first speed VA. In the ABS control, the electronic controller 32 intermittently operates the braking device 24 to lower the braking force of the braking device 24.

In a case where the absolute value of the difference of the first speed VA and the second speed VB during the execution of the ABS control is smaller than or equal to the second predetermined difference, the electronic controller 32 terminates the ABS control. Therefore, the ABS control is executed on the human-powered vehicle A in a further preferred manner. The second predetermined difference is a speed difference allowing for determination that the rotating body D has been unlocked because of the decrease in the difference of the first speed VA and the second speed VB resulting from initiation of the ABS control. In a case where the ABS control decreases the braking force of the rotating body D, the electronic controller 32 adjusts the decrease amount of the braking force of the rotating body D in accordance with the difference of the first speed VA and the second speed VB. Therefore, the ABS control is executed on the human-powered vehicle A in a further preferred manner. The electronic controller 32 increases the decrease amount of the braking force of the rotating body D as the absolute value of the difference of the first speed VA and the second speed VB increases. This limits sliding of the human-powered vehicle A. More specifically, as the absolute value of the difference of the first speed VA and the second speed VB increases, the electronic controller 32 reduces the pressing force of the disc brake caliper of the braking device 24 with respect to the rotating body D to increase the decrease amount of the braking force of the rotating body D. The electronic controller 32 acquires the first speed VA from the first detector 22 that detects the first speed VA. Therefore, the first speed VA can be easily obtained. The electronic controller 32 calculates the second speed VB based on the detection result of the second detector 30. The electronic controller 32 executes the ABS control on the first rotating body DA based on the detection result from the first detector 22 and the detection result of the first rotation detector 30A. The electronic controller 32 executes the ABS control on the second rotating body DB based on the detection result from the first detector 22 and the detection result of the second rotation detector 30B. Therefore, the ABS control is executed on the human-powered vehicle A, which includes the rotating bodies D, in a further preferred manner.

Figure 3:
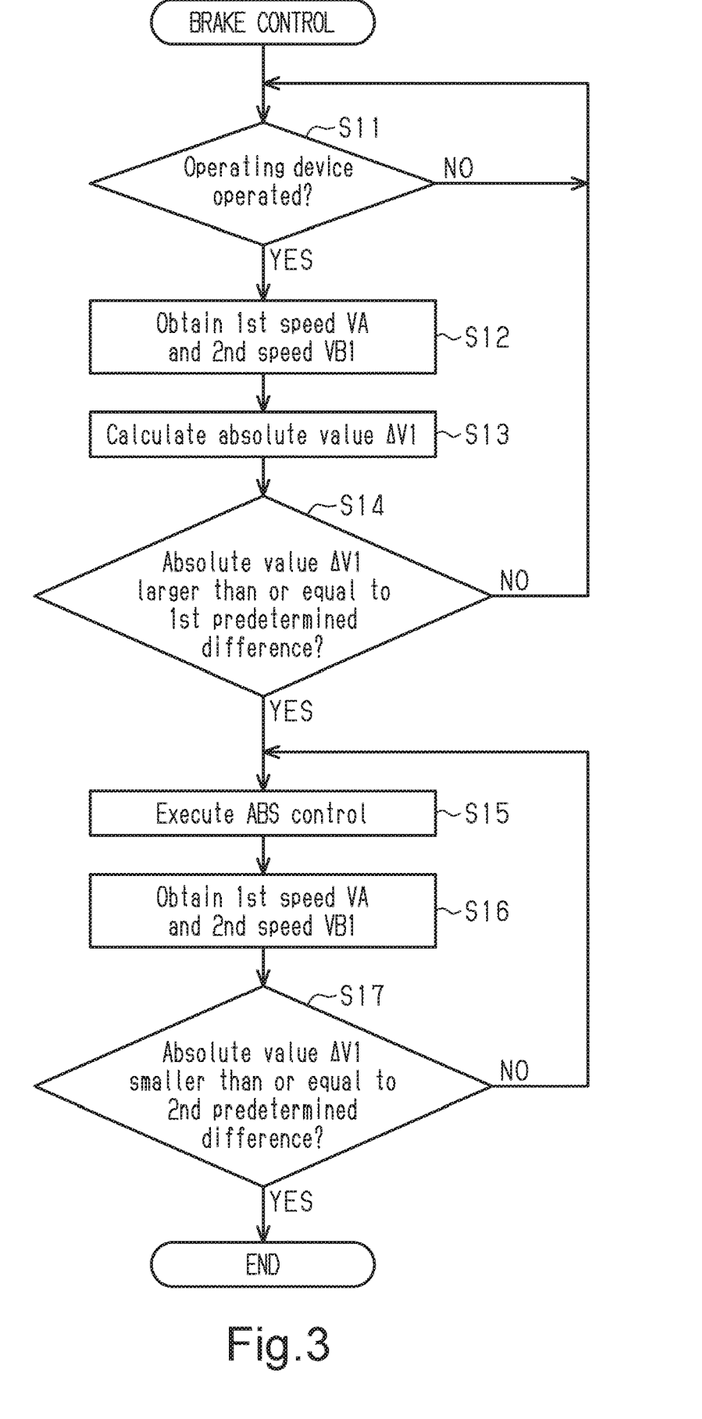
FIG. 3 is a flowchart showing one example of the procedures a control executed by an electronic controller for processing brake control on a first rotating body.

An example of the brake control executed on the first rotating body DA will now be described with reference to FIG. 3.

In step S11, the electronic controller 32 determines whether or not the operating device 26 corresponding to the first braking unit 24A has been operated based on the output of the corresponding operating device 26. If the determination result of step S11 is a negative determination, then the electronic controller 32 repeatedly executes the determination process of step S11. If the determination result of step S11 is an affirmative determination, then the electronic controller 32 executes the process of step S12. In step S12, the electronic controller 32 obtains the first speed VA and a second speed VB1, which is related to the first rotating body DA. In step S13, the electronic controller 32 calculates the absolute value ΔV1 of the difference of the first speed VA and the second speed VB1. In step S14, the electronic controller 32 determines whether or not the absolute value ΔV1 is larger than or equal to the first predetermined difference. If the determination result of step S14 is a negative determination, then the electronic controller 32 executes the process of step S11. If the determination result of step S14 is an affirmative determination, then the electronic controller 32 executes step S15. In step S15, the electronic controller 32 executes the ABS control on the first rotating body DA. In the ABS control, the electronic controller 32 intermittently drives the first braking unit 24A so that the braking force of the first braking unit 24A decreases. In step S16, the electronic controller 32 obtains the first speed VA and the second speed VB1. In step S17, the electronic controller 32 determines whether or not the absolute value ΔV1 is smaller than or equal to the second predetermined difference. If the determination result of step S17 is a negative determination, then the electronic controller 32 again executes the processes from step S15.

Figure 4:
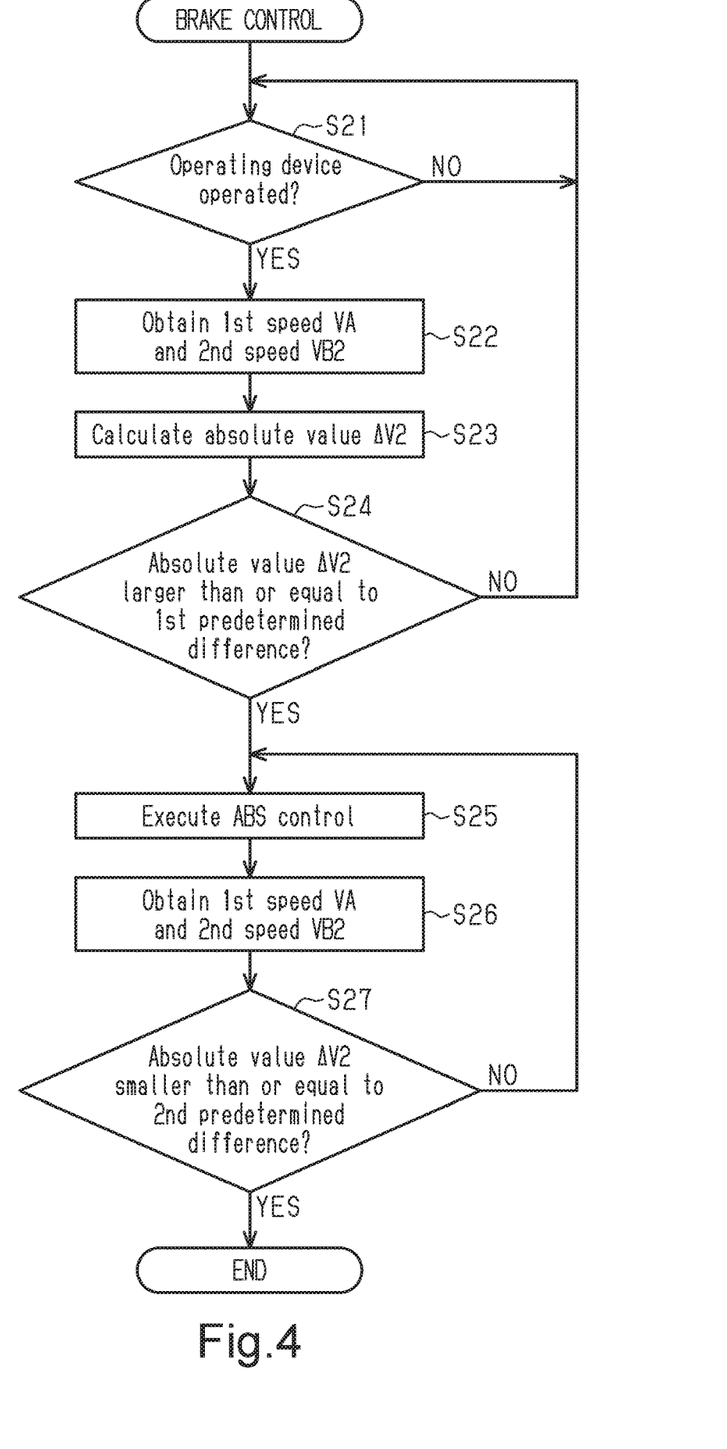
FIG. 4 is a flowchart showing one example of a control executed by the electronic controller for processing brake control on a second rotating body.

An example of the brake control executed on the second rotating body DB will now be described with reference to FIG. 4. The brake control for the second rotating body DB is executed in parallel with the brake control for the first rotating body DA.

In step S21, the electronic controller 32 determines whether or not the operating device 26 corresponding to the second braking unit 24B has been operated based on the output of the corresponding operating device 26. If the determination result of step S21 is a negative determination, then the electronic controller 32 repeatedly executes the determination process of step S21. If the determination result of step S21 is an affirmative determination, then the electronic controller 32 executes the process of step S22. In step S22, the electronic controller 32 obtains the first speed VA and a second speed VB2, which is related to the second rotating body DB. In step S23, the electronic controller 32 calculates the absolute value ΔV2 of the difference of the first speed VA and the second speed VB2. In step S24, the electronic controller 32 determines whether or not the absolute value ΔV2 is larger than or equal to the first predetermined difference. If the determination result of step S24 is a negative determination, then the electronic controller 32 executes the process of step S21. If the determination result of step S24 is an affirmative determination, then the electronic controller 32 executes step S25. In step S25, the electronic controller 32 executes the ABS control on the second rotating body DB. In the ABS control, the electronic controller 32 intermittently drives the second braking unit 24B so that the braking force of the second braking unit 24B decreases. In step S26, the electronic controller 32 obtains the first speed VA and the second speed VB2. In step S27, the electronic controller 32 determines whether or not the absolute value ΔV1 is smaller than or equal to the second predetermined difference. If the determination result of step S27 is a negative determination, then the electronic controller 32 again executes the processes from step S25.

The brake system 10 has the advantage described below. The traveling environment of the human-powered vehicle A is taken into consideration with regard to the ABS control. Thus, the electronic controller 32 is executed on the ABS control on the human-powered vehicle A in a further preferred manner.

Modifications

The embodiment described above exemplifies an applicable form of a brake control device and a brake system according to the present disclosure and is not intended to limit the forms. The brake control device and the brake system according to the present disclosure can take forms different from those exemplified in the embodiment. One example is a form in which part of the configuration of the embodiment is replaced, changed, or omitted, or a form in which a new configuration is added to the embodiment. An example of a modification of the embodiment will now be described below.

The first predetermined difference used for the brake control can be changed to any value. In the brake control device 20 of the modification, the electronic controller 32 uses a first predetermined difference that differs between the brake control related to the first braking unit 24A and the brake control related to the second braking unit 24B.

The second predetermined difference used for the brake control can be changed to any value. In the brake control device 20 of the modification, the electronic controller 32 uses a second predetermined difference that differs between the brake control related to the first braking unit 24A and the brake control related to the second braking unit 24B.

The configuration of the brake system 10 can be changed to any configuration. In a first example, the brake system 10 includes the brake control device 20, the first detector 22, and the second detector 30. The brake control device 20 includes the electronic controller 32, which is provided on the human-powered vehicle A including the main body A1 and the rotating body D rotated relative to the main body A1, to execute the ABS control on the rotating body D. The first detector 22 acquires information from the traveling environment. The second detector 30 acquires the rotational speed of the rotating body D. The electronic controller 32 executes the ABS control based on the information from the first detector 22 and the second detector 30. Therefore, the ABS control is executed on the human-powered vehicle A in a further preferred manner. In a second example, the brake system 10 includes the brake control device 20, the assist device 28, the first detector 22, and the second detector 30. The brake control device 20 includes the electronic controller 32, which is provided on the human-powered vehicle A including the main body A1 and the rotating body D rotated relative to the main body A1, to execute the ABS control on the rotating body D. The assist device 28 includes the driving unit 28A that assists the driving force of the human-powered vehicle A. The first detector 22 is configured to obtain at least one of the speed and the acceleration of the human-powered vehicle A. The second detector 30 is configured to obtain the rotational speed of the rotating body D. The electronic controller 32 executes the ABS control based on the information from the first detector 22 and the second detector 30. In the case of the second example, the first detector 22 is configured to obtain at least one of the speed and the acceleration of the human-powered vehicle A from the assist device 28. Therefore, the ABS control is executed on the human-powered vehicle A in a further preferred manner.

The first detector 22 of the brake system 10 can be mounted at any position. A brake system 10 of a modification includes a first detector 22 mounted on the body of a user of the human-powered vehicle A. An example of the first detector 22 of this modification is a GPS sensor.

The braking device 24 can have any configuration. In a first example, the braking device 24 includes at least one of the first braking unit 24A and the second braking unit 24B, an actuator for driving the braking units 24A and 24B with fluid, and an electric driving unit that drives the braking unit 24A, and 24B by driving the actuator (pump). An example of the fluid is hydraulic fluid. The actuator is driven by the electric driving unit, and the pressure of the fluid is applied to the braking units 24A and 24B. The braking units 24A and 24B are configured to brake the rotating body D of the human-powered vehicle A with the pressure of the fluid. According to this example, the braking device 24 is a hydraulic braking device. In a case where the braking device 24 is a hydraulic braking device, the electronic controller 32 can be configured to increase the decrease amount of the hydraulic pressure or the hydraulic amount of the hydraulic fluid applied to the braking units 24A and 24B as the absolute value of the difference of the first speed VA and the second speed VB becomes larger. The braking device 24 and the operating device 26 can be fluidly connected or can be electrically connected. In the second example, the braking device 24 includes at least one of the first braking unit 24A and the second braking unit 24B, an actuator (not shown) for driving the braking units 24A and 24B with a cable, and an electric driving unit that drives the braking units 24A, 24B by driving the actuator. The electric driving unit is operated to drive the actuator and pull the cable. The braking units 24A and 24B are configured to brake the rotating body D of the human-powered vehicle A if the cable is pulled. According to this example, the braking device 24 is a cable type braking device. In a case where the braking device 24 is the cable type braking device, the electronic controller 32 can be configured to increase the decrease amount of the tension or the pulling amount of the cable connected to the braking units 24A and 24B as the absolute value of the difference of the first speed VA and the second speed VB becomes larger. The braking device 24 and the operating device 26 can be mechanically connected or can be electrically connected. In the first example and the second example, the braking units 24A, 24B, the actuator, and the electric driving unit can be arranged in one housing or can be individually arranged in the human-powered vehicle A.

The above embodiment exemplifies a case where the brake system 10 according to the present disclosure is applied to a bicycle. However, the brake system 10 according to the present disclosure is applicable not only to a bicycle but also to any human-powered vehicle A.

What is claimed is:
1. A brake control device comprising:
an electronic controller configured to execute an ABS control on a rotating body of a human-powered vehicle, the electronic controller being further configured to execute the ABS control based on a relationship between a first speed and a second speed related to the human-powered vehicle, the first speed being a speed of the human-powered vehicle that is detected by a first detector based on information of a traveling environment, and the second speed being a speed of the human-powered vehicle that is calculated based on a rotational speed of the rotating body.

2. The brake control device according to claim 1, wherein the information of the traveling environment includes a position of the human-powered vehicle relative to the traveling environment.

3. The brake control device according to claim 1, wherein the first speed includes a speed of the human-powered vehicle relative to a traveling road surface.

4. The brake control device according to claim 1, wherein the electronic controller is configured to execute the ABS control based on a difference between the first speed and the second speed.

5. The brake control device according to claim 4, wherein the electronic controller is configured to start the ABS control when an absolute value of the difference between the first speed and the second speed is larger than or equal to a first predetermined difference.

6. The brake control device according to claim 4, wherein the electronic controller is configured to terminate the ABS control when an absolute value of the difference between the first speed and the second speed during execution of the ABS control is smaller than or equal to a second predetermined difference.

7. The brake control device according to claim 1, wherein the electronic controller is configured to adjust an amount that a braking force of the rotating body is reduced in accordance with a difference between the first speed and the second speed when the braking force of the rotating body is decreased by the ABS control.

8. The brake control device according to claim 7, wherein the electronic controller is configured to that the braking force of the rotating body is reduced as the absolute value of the difference between the first speed and the second speed increases.

9. The brake control device according to claim 1, wherein the first detector includes an imaging device that is configured to capture an image of the traveling environment.

10. The brake control device according to claim 1, wherein the first detector includes a transmitting unit that is configured to transmit a signal toward the traveling environment and a receiving unit that is configured to receive a reflected signal from the traveling environment.

11. The brake control device according to claim 10, wherein the transmitting unit includes a light emitter that is configured to emit light to a traveling road surface, and the receiving unit includes a light receiver that is configured to receive light reflected from the traveling road surface.

12. The brake control device according to claim 1, wherein the first detector includes a LIDAR.

13. The brake control device according to claim 1, wherein the first detector includes a GPS sensor.

14. The brake control device according to claim 1, wherein the electronic controller is configured to calculate the second speed based on a detection result of a second detector that detects at least one of a rotational speed of the rotating body and a rotational speed of a transmission member that transmits human driving force to the rotating body.

15. The brake control device according to claim 1, wherein the rotating body includes at least one of a wheel provided on the human-powered vehicle and a rotating member rotated integrally with the wheel.

16. The brake control device according to claim 1, wherein the rotating body includes a first rotating body and a second rotating body, the electronic controller is configured to execute the ABS control on the first rotating body based on a detection result from the first detector configured to detect the first speed and a detection result of a first rotation detector configured to detect a rotational speed of the first rotating body, and the electronic controller is configured to execute the ABS control on the second rotating body based on the detection result from the first detector and a detection result of a second rotation detector configured to detect a rotational speed of the second rotating body.

17. A brake system comprising the brake control device according to claim 1, and the braking system further comprising the first detector.

18. The brake system according to claim 17, wherein the first detector is provided on at least one of a main body of the human-powered vehicle and an attachment member moved relative to the traveling environment integrally with the main body.

19. A brake system comprising the brake control device according to claim 14, and the braking system further comprising the second detector.

20. A brake system comprising the brake control device according to claim 1, and the braking system further comprising a braking device.

21. The brake system according to claim 17, further comprising an operating device configured to be manually operated to brake the rotating body.

22. The brake system according to claim 17, further comprising a driving unit that assists a driving force of the human-powered vehicle.

23. A brake system comprising:
a brake control device provided on a human-powered vehicle including a main body and a rotating body rotated relative to the main body, the brake control device including an electronic controller configured to execute an ABS control on the rotating body;
a first detector configured to detect a first speed based on information from a traveling environment; and
the electronic controller being further configured to execute the ABS control based on the first speed detected by the first detector and the rotational speed obtained by the second detector.

24. A brake system comprising:
a brake control device provided on a human-powered vehicle including a main body and a rotating body rotated relative to the main body, the brake control device including an electronic controller configured to execute an ABS control on the rotating body;

an assist device including a driving unit that assists a driving force of the human-powered vehicle;

a first detector configured to obtain at least one of a speed and an acceleration of the human-powered vehicle from the assist device; and a second detector configured to obtain a rotational speed of the rotating body, the electronic controller being further configured to execute the ABS control based on the at least one of the speed and the acceleration of the human-powered vehicle obtained from the first detector and the rotational speed obtained by the second detector.

* * * * *